BEST AVAILABLE COPY

June 27, 1944. R. H. EARLE ET AL Re. 22,504

LIGHTNING ARRESTER

Original Filed April 4, 1936 3 Sheets-Sheet 1

Inventors:
Ralph H. Earle
Alwin G. Steinmayer
By: Brown Jackson Boettcher & Dienner
Attys.

BEST AVAILABLE COP'

June 27, 1944. R. H. EARLE ET AL Re. 22,504

LIGHTNING ARRESTER

Original Filed April 4, 1936 3 Sheets-Sheet 2

Inventors:
Ralph H. Earle
Alwin G. Steinmayer

By: Brown Jackson Boettcher Dienner
Attys.

BEST AVAILABLE COP'

June 27, 1944. R. H. EARLE ET AL Re. 22,504

LIGHTNING ARRESTER

Original Filed April 4, 1936 3 Sheets-Sheet 3

Inventors:
Ralph H. Earle
Alwin G. Steinmayer

By: Moore Jackson Boucher & Dinner
Attys.

BEST AVAILABLE COPY

Reissued June 27, 1944 BEST AVAILABLE COPY Re. 22,504

UNITED STATES PATENT OFFICE 22,504

LIGHTNING ARRESTER

Ralph H. Earle, Wauwatosa, and Alwin G. Steinmayer, Milwaukee, Wis., assignors to Line Material Company, South Milwaukee, Wis., a corporation of Delaware Original No. 2,165,964, dated July 11, 1939, Serial No. 72,734, April 4, 1936, which is a continuation of Serial No. 716,244, March 19, 1934. Application for reissue January 17, 1944, Serial No. 518,656

3 Claims. (Cl. 175—30)

Our invention relates generally to lightning arresters and it has particular relation to lightning arresters for protecting transmission lines operating at a frequency of 60 cycles or less.

This application is a continuation of our application Serial No. 716,244, filed March 19, 1934.

In order to protect an electrical power transmission system from abnormal voltages due to lightning and switching disturbances, surge arresters are provided. The arresters are connected between the transmission line conductors and ground in order to drain off the excess voltages caused by these disturbances. The ideal arrester will immediately relieve the system of any abnormal voltage by providing a conducting path to ground through which current can flow but which will not permit the flow of power current under normal operating conditions at normal line voltage. That is, during normal operating conditions the arrester offers a substantially infinite resistance to the flow of power current at the system voltage but on the occurrence of an abnormal voltage caused by lightning or switching disturbances, the resistance of the arrester becomes such that it provides a path to ground through which the surge current can flow until the voltage causing it has been dissipated, at which time, however, power current is not permitted to flow.

A typical lightning arrester for distribution systems comprises a spark gap assembly arranged to be connected in series circuit relation with valve material that offers a comparatively high resistance to the flow of current. An arrester, comprising the series connected spark gap assembly and valve material, is connected between each of the transmission conductors and ground. The valve material may comprise silicon carbide in various forms, either granular or in blocks, or it may comprise lead peroxide pellets which, upon heating, become coated at their contact points with litharge. Various other types of valve material may also be used.

It has been customary in the construction of lightning arresters in the prior art to provide them with an opaque housing of ceramic material such as porcelain around the spark gap assembly and valve material. The housing serves as a frame for supporting the arrester element as a unitary structure and permits mounting of the arrester on a pole or transmission tower for connection to a transmission conductor.

On flow of surge current, due either to a lightning stroke or to a switching disturbance, a conducting path is momentarily established through the arrester which, in the ideal arrester, as stated hereinbefore, should be disrupted on termination of flow of surge current. In this manner the arrester simulates the action of a valve which is opened on occurrence of an abnormal voltage on the system to permit the flow of surge current to ground but which is automatically closed as soon as the excess voltage is dissipated. If the valve does not close or the conducting path is not disrupted, then power current of normal line frequency may flow, causing an undesirable leak or power loss and also destroying the effectiveness of the arrester for protecting the system against flow of power current after a succeeding abnormal voltage condition.

The flow of surge current through the arrester due to abnormal voltage caused by a lightning or a switching disturbance takes place only during an infinitesimally short time. Ordinarily, the surge current will flow only during a few microseconds. However, the amount of current which flows may be relatively great and in many cases it is enough to destroy the arrester entirely or to crack the porcelain housing. In such case the customary casual inspection will reveal the failure of the arrester and it may be replaced with a new one.

In many instances, however, the flow of surge current is not enough to totally or even partially destroy the arrester or its housing, but it may be sufficient to fuse some of the particles, forming the valve material, into a conducting path of comparatively low resistance to flow of power current. After the flow of surge current has ceased, the resistance of the arrester is not restored to its normal or substantially infinite resistance to flow of current at power frequency, and a slight discharge or flow of power current takes place through it. When an arrester is operating under these conditions, it should be replaced, since it no longer is capable of interrupting the flow of power current after a surge breaks down the gap. The next surge may cause the arrester to become fully grounded, thereby possibly causing a short circuit on the system, necessitating the operation of circuit breakers or fuses to clear the fault.

The continued flow of power current through the path rendered conducting by the surge current and across the spark gaps, causes the arrester to function somewhat in the manner of a spark gap radio transmitter. The transmission line acts in this case as the antenna of a radio transmitter. Although the radiating power of such a transmitter may be comparatively slight,

BEST AVAILABLE COP' still considerable interference with radio reception results, particularly in those instances where radio receivers are operated in the vicinity of the power line. The radio interference may be sufficiently severe to totally prevent the reception of any broadcast program or radio communication.

When arresters of the prior art are employed using opaque housings of porcelain or the like, it is not possible to determine whether or not they have failed to this extent without a careful examination and testing of each arrester. This means that a periodic examination of the arresters must be made and a test conducted to determine their resistance or a succeeding surge must be awaited to completely destroy the arrester or cause it to ground the system. Even when the arrester has been grounded, unless it is fractured in some manner by the flow therethrough of surge or power current, it may be difficult to ascertain the exact location of the fault. Under such conditions it may be necessary to disconnect a large number of arresters which are in proper operating condition in order to isolate the particular arrester that has failed.

The object of our invention, generally stated, is to provide a surge arrester for transmission lines of commercial frequency which shall be simple and efficient in operation and which may be readily and economically manufactured, installed and inspected.

The principal object of our invention is to provide for visually indicating that a surge arrester on a power line has failed.

An important object of our invention is to provide for visually indicating the flow of power current through a path in a lightning arrester rendered conducting by a lightning discharge.

Still another object of our invention is to provide for rendering visible from any point the light emitted on flow of power current from a path in a lightning arrester rendered conducting by a lightning discharge.

A more specific object of our invention is to provide a lightning arrester comprising spark gap and valve material assemblies with a housing of light transmitting material, whereby the light emitted on flow of power current through a path in the valve material rendered conducting by a lightning discharge, will be visible.

Other objects of our invention will in part be obvious and in part appear hereinafter.

Our invention accordingly is disclosed in the embodiments hereof shown in the accompanying drawings and it comprises the features of construction, combination of elements and arrangement of parts which will be exemplified in the constructions hereinafter set forth, and the scope of the application of which will be indicated in the appended claims.

For a more complete understanding of the nature and scope of our invention, reference may be had to the following detailed description, taken in connection with the accompanying drawings, in which—

Figure 1:
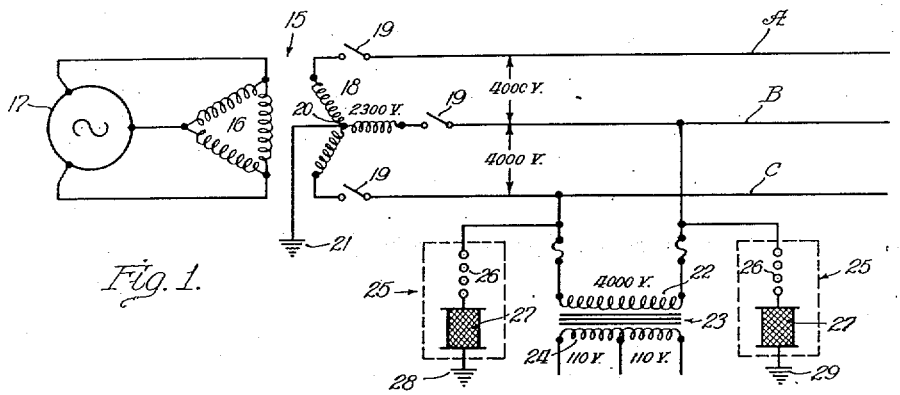
Figures 1, 2 and 3 illustrate, diagrammatically, different circuit connections for lightning arresters as applied to commercial power distribution systems.

As a result of a careful study of the results of lightning and switching disturbances on a power system having connected thereto lightning arresters for draining off the abnormal voltages, we have discovered that the discharge takes place in the arrester, in most instances, along the inner periphery of the housing surrounding the spark gap assembly and valve material. That is, on the occurrence of a comparatively light surge, the discharge takes place through the arrester and, on termination of flow of surge current, the condition of the arrester is restored to its normal condition to offer a substantially infinite resistance to the flow of power current therethrough. On the occurrence of an exceptionally heavy or extremely high surge voltage, a surge current of such appreciable value may flow through the arrester that it is destroyed or the housing is cracked, so that the arrester is effectually destroyed. A large number of surges occur, however, between these two values, the current in each of which is sufficient to damage the arrester but is not great enough to destroy it or even to crack the housing so as to entirely clear the line of the arrester. We have observed that it is this type of discharge which takes place generally along the inner wall or periphery of the housing surrounding the spark gap assembly and valve material. This discharge is sufficient, in many instances, to fuse together a number of the particles forming the valve material, so that a path of comparatively low resistance is formed in the arrester, thereby lowering its resistance and permitting the flow therethrough of a slight amount of power current at power frequency from the transmission line.

Since the resistance of the arrester under these conditions, still remains at a comparatively high value, only a small amount of power current will flow therethrough. However, this amount of current constitutes a leak from the power system and, in flowing between the electrodes of the spark gap assembly, generates oscillations of radio frequency which tend to interfere with radio reception in the vicinity of the power line. A more serious objection, however, is that the effectiveness of the arrester for protecting the transmission line from outages caused by the flow of power current after static surges pass through the arrester, is largely destroyed. Therefore, an arrester which is operating under these conditions should at once be removed from the system and replaced with a new arrester in proper operating condition.

While it is comparatively easy to inspect a transmission line and note arresters that have completely failed due to the excessive flow of current therethrough causing their destruction, it is difficult, if not impossible, to detect the arrester that has only partially failed and which constitutes a slight leak in the insulation of the transmission line from ground. This is due to the fact that it has been the practice in the past

BEST AVAILABLE COPY o house the spark gap and valve material assemblies in an opaque housing of porcelain or the like through which it is, of course, impossible to see from the exterior, and likewise through which it is impossible for light rays to be transmitted, caused by current flowing along paths in the arrester that have been rendered conducting by lightning or switching surges.

In order to provide for readily inspecting lightning arresters as installed on a transmission line without making a detailed examination and test, we have dispensed with the customary opaque porcelain housing and have substituted therefor a housing of relatively thick light-transmitting material such as glass, and preferably of a heat-resisting type which may be purchased in the open market under the name of "Pyrex." The commercial product known as "Pyrex" has a very low coefficient of expansion and a high melting point. Since the flow of power current along a path rendered conducting by a lightning discharge generally takes place along the inner surface of the glass housing, light rays emanating therefrom are readily visible through the glass housing and, as a result, it is a simple matter to determine by inspection, even when the observer is some distance away from the arrester, that it has failed and that it should be replaced. Moreover, the housing of glass is made comparatively thick, so that light rays emanating from along a path at one side of the arrester will be visible from any point thereabout, due to the reflecting characteristics of the glass wall of the housing.

In order to illustrate in more detail the various applications of our novel lightning arrester to power systems of 60 cycles or less, certain circuits are illustrated in the drawings. These circuits are typical of the distribution circuits which it is the present day practice to use for distributing electric power for domestic and industrial purposes.

Referring now particularly to Figure 1 of the drawings, it will be observed that a 3-phase transformer, shown generally at 15 is provided, having a delta connected primary winding 16 which may be connected for energization to a source 17 of alternating current, such as a 60 cycle generator. The transformer 15 is provided with a star connected secondary winding 18, the terminals of which may be connected through disconnecting switches 19 to energize transmission line conductors A, B and C. The neutral point 20 of the secondary winding 18 is grounded at 21, as illustrated. Since each phase of the secondary winding 18 is arranged to have 2300 volts impressed thereacross, a voltage of 4000 volts appears between each of the conductors A, B and C, as illustrated.

In order to provide for connecting the high voltage conductors A, B and C to a secondary distribution system for domestic or industrial use, the primary winding 22 of a distribution transformer, shown generally at 23, is connected across the conductors B and C. The secondary winding 24 of the distribution transformer 23 is provided with a mid-tap so that a three-wire 110 volt circuit is provided, as is customary for residential use.

In order to protect the distribution transformer 23 from surge current due to lightning and switching disturbances, lightning arresters, shown generally at 25, are provided. Each of the arresters 25 comprises a series of spark gaps 26 connected to a resistor 27 having a comparatively high resistance such as valve material comprising silicon carbide or the like. The arresters 25 may be grounded at 28 and 29.

If a lightning or switching surge occurs on the conductor C it will pass through the arrester 25 to ground at 28, breaking down the spark gaps 26 and causing current to flow in an amount corresponding to the voltage accompanying the disturbance. It will be noted that in this instance a line voltage of 2300 volts is applied across the arrester 25 between the conductor C and ground 28, which is, of course, electrically connected to the ground 21 and the neutral point 20 of the secondary winding 18. If the amount of surge current is such that the arrester 25 is capable of handling it without failure or damage thereto, the arrester will interrupt the follow current when the next zero point in the wave of power current occurs and the system will be restored to normal operating conditions.

Figure 2:
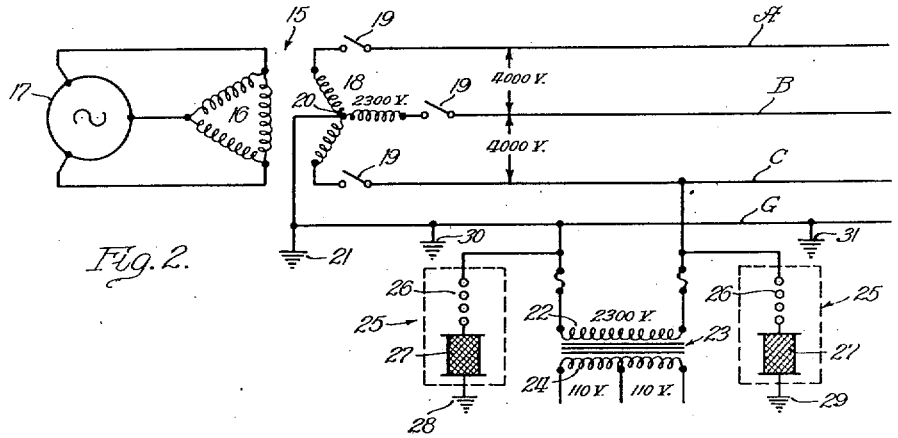

As a modification of the circuit connections shown in Figure 1, the circuit connections shown in Figure 2 may be used. It will be here noted that a neutral or ground conductor G is provided which is connected to the neutral point 20 of the secondary winding 18 of the transformer 15. This conductor G is carried along with the conductors A, B and C, forming the transmission line, and it is grounded at various points, 30 and 31, for example. In this instance the primary winding 22 of the distribution transformer 23 is connected between the conductor C and the ground or neutral conductor G and it has applied thereto 2300 volts. If a lightning or switching surge strikes the conductor C the discharge through the arrester 25 to ground 28 will take place as described hereinbefore in connection with Figure 1. However, if the surge should strike the ground or neutral wire G, it may pass to ground through one of the ground connections at 30 or 31, or if there is no ground connection close enough, the surge will travel along the neutral wire G until it comes to a lightning arrester which may be connected thereto, at which point it will pass to ground. Since the conductor G is at ground potential, there will be no follow current and, as a result, the only damage that can possibly be done results from the flow of surge current and not from the flow of follow current.

Figure 3:
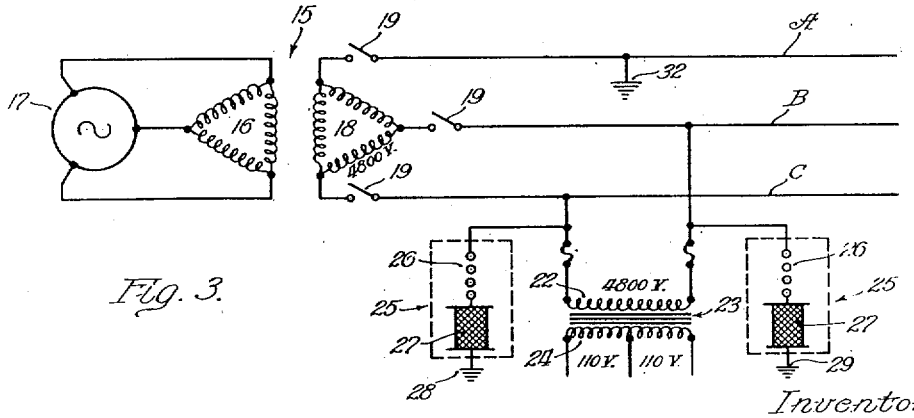

Still another form of transmission circuit which may be employed is illustrated in Figure 3 of the drawings. As there shown, the transformer 15 is provided having its secondary winding 18 connected in delta to the conductors A, B and C. Each phase of the secondary winding 18 may have applied thereto, as indicated, 4800 volts and this voltage is applied to the primary winding 22 of the distribution transformer 23 connected across the conductors B and C. In the event that a lightning or switching surge appears on one or the other of the conductors B or C, it will be dissipated through either of the arresters 25 to the ground connections 28 or 29, respectively. Since the secondary winding 18 of the transformer 15 is not grounded, there will be no follow current and the only damage that can occur, providing the remaining conductor A of the power line is ungrounded, will be due to the flow of surge current. It often happens, however, that an accidental ground, as at 32, occurs on one of the conductors, (here shown, the conductor A), and then the full line voltage of 4800 volts will be effective to continue the flow of power current along the path which has been

BEST AVAILABLE COPY rendered conducting by the flow of surge current due to the occurrence of the abnormal or excessive voltage resulting from the lightning or switching disturbance.

From a consideration of the foregoing description of various transmission circuits which are now in use, it will be observed that the flow of power current constitutes an important factor in the application, construction and operation of lightning arresters. If only the surge current had to be considered, then the problem would be considerably simplified. However, the path rendered conducting by the flow of surge current, either as a continuous conducting path through contiguous particles, or through an ionized atmosphere, instantly offers a path for the flow of power current due to the ever present line voltage which tends to maintain this current flow. It will, therefore, be clear that the flow of surge current resulting from lightning or switching disturbances, prepares the way for the flow of power current that may or may not take place, depending upon the amount of current in the surge, the time of its occurrence, and the conditions created in the arrester as a result of its flow therethrough.

Figure 4:
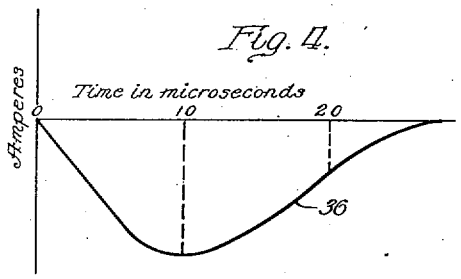
Figures 4 and 5 show curves which illustrate certain operating characteristics of a power distribution system on application thereto of lightning or switching disturbances.
Figure 5:
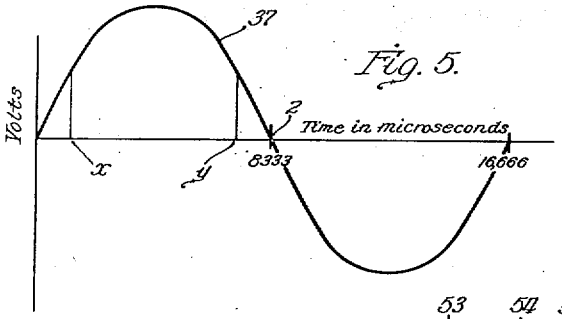

In Figure 4 of the drawings, units of amperes of current flow, during a lightning discharge, are plotted as ordinates, while units of time, in microseconds, are plotted as abscissae, for the curve 36. The curve 36 illustrates a typical relationship between the amperes of surge current and the time of duration of the surge, which, as illustrated, may be of the order of 20 microseconds. The curve 37, shown in Figure 5 of the drawings, is plotted with units of volts as ordinates and units of time in microsecondes as abscissae, for one cycle of a 60-cycle alternating current. It will be observed that each half cycle corresponds to approximately 8333 microseconds and therefore that the time during which the lightning surge takes place, as indicated by the curve 36 in Figure 4 of the drawings, when plotted to the scale used for the curve 37, would be only the width of a very thin line. If the lightning discharge takes place at the time $x$, then the follow current, as represented by the balance of the curve 37, to its next zero point, will tend to flow for a time corresponding to the balance of the curve 37 before it passes through its next zero point, assuming unity power factor. If the surge occurs at the time $y$, then the time during which follow current tends to flow will be correspondingly decreased. If the surge should occur at the time $z$, corresponding to the zero point of the voltage wave 37, then there would be no tendency for flow of follow current unless the surge current was of such a magnitude that the arrester fails and therefore conducts power current during the next half-cycle.

It will then be observed that the likelihood of the flow of power current during at least one half-cycle is comparatively great and that it is the flow of power current over the path which has been rendered conducting by the surge current that constitutes one of the principal factors in the operation of a lightning arrester. If the surge would always occur at a time corresponding to the zero point of the voltage wave 37 or at the time $z$, then the damage to the arrester caused by the flow of follow current would ordinarily not occur. However, such is not the case under normal operating conditions, and there is always the possibility that a certain amount of follow current will flow for a large portion of a half cycle at least, during which time a sufficiently low resistance path may be created and maintained in the arrester so that during the next succeeding half cycle the power current will continue to flow, although not in an amount which would be sufficient to cause destruction of the arrester. It is to give an indication of the flow of such current that our invention is particularly useful and has provided a highly satisfactory means whereby the flow of such current can be readily detected with a minimum of inspection.

Figure 6:
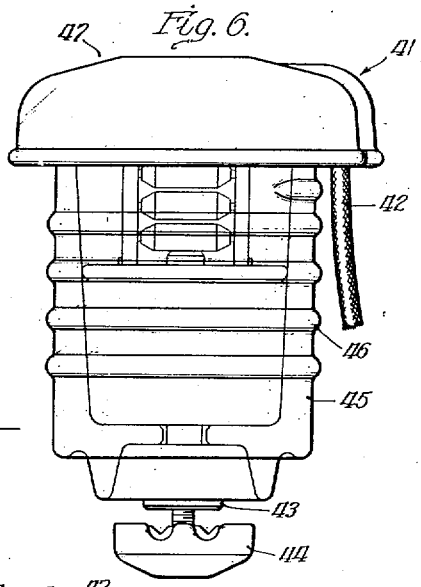
Figure 6 is a view, in side elevation, of a lightning arrester constructed in accordance with our invention.

Referring now particularly to Figure 6 of the drawings, it will be observed that a lightning arrester, shown generally at 41, is there illustrated, which is provided with a conductor 42 for connection to one of the power conductors of a transmission line and a terminal nut 43 to which a ground conductor may be connected by means of a terminal assembly 44. The arrester 41 is provided with a housing 45 which is formed preferably of a heat resisting glass that may be purchased in the open market under the name of "Pyrex." The outer surface of the glass housing 45 is provided with beads 46 extending entirely or partly around it in order to increase the creepage distance between the top and bottom portions of the housing 45 and also to increase the light dispersive effects of the glass housing on flow of power current through a path rendered conducting in the arrester by surge current. A cap 47, formed preferably of insulating material, such as glass, is positioned on top of the arrester 41.

Figure 7:
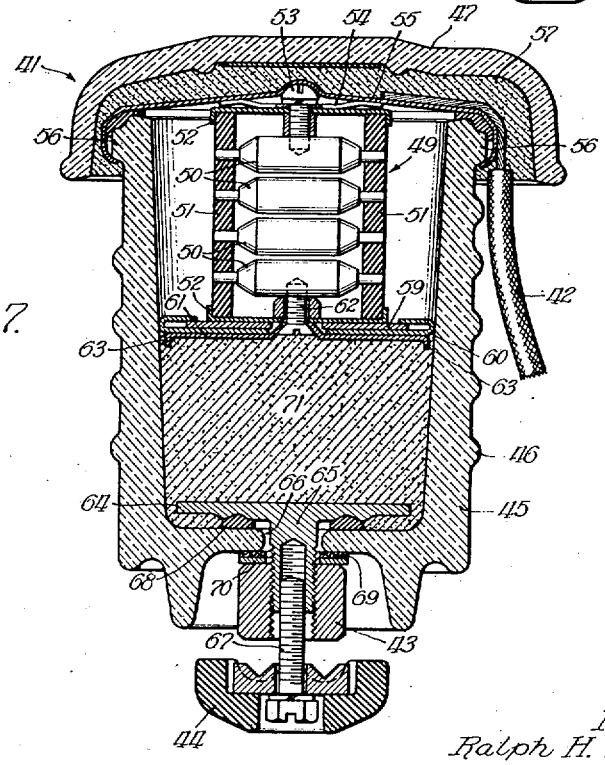
Figure 7 is a sectional view showing the interior details of construction of our novel lightning arrester.

The interior details of construction of the arrester 41 are more clearly shown in Figure 7 of the drawings. As there illustrated, a spark gap assembly, shown generally at 49, is provided which may comprise four cylindrical spark gap electrodes 50 mounted between insulating posts 51 which are provided with caps 52, preferably of brass, at each end thereof. By means of a screw 53 and a leaf spring 54, the top spark gap electrode 50 is connected to an upper terminal cap 55, preferably formed of copper, to which the conductor 42 may be connected as by soldering. The upper end of the glass housing 45 is provided with a circumferential bead 56 around which the outer periphery of the upper cap 55 may be crimped. The cap 47 is secured on top of the arrester 41 by means of a suitable cement 57, such as asphalt, which completely covers the upper cap 55 and provides a liquid-tight connection thereover.

The spark gap assembly 49 is mounted on a brass disc 59 which is surrounded, as illustrated, by means of the inwardly turned edge of a metal disc 60 that may be expanded into engagement with the inner wall of the housing 45. An upper electrode 61 is provided which may be connected by means of a screw 62 to the bottom spark gap electrode 50. The upper electrode 61 may be circular in form and composed of brass. The outer periphery 63 of the upper electrode 61 may be curved downwardly, if desired, to tend to concentrate the flow of surge current along the inner surface of the housing 45. While the outer periphery 63 of the upper electrode 61 has been illustrated as being curved downwardly, it will be understood that such construction is not essential, and that satisfactory operation will result if the upper electrode 61 comprises merely a flat disc with the curved outer periphery 63 omitted. We have constructed and tested many lightning arresters having the upper electrode 61 formed

BEST AVAILABLE COPY as a flat disc only and found that they operate satisfactorily and that generally the surge current will flow along the surface of the glass housing 45.

At the bottom of the glass housing 45 a lower electrode 64 is provided which is preferably of forged bronze. The lower electrode 64 is provided with a flat upper surface and is arranged to be coaxial with the upper electrode 61. The lower electrode 64 is provided with a downwardly extending inwardly and externally threaded boss 65 which projects through an opening 66 in the bottom of the glass housing 45. A bolt 67 is provided for engaging the interior threads of the boss 65 to move the terminal assembly 44 upwardly for engaging a ground connection between it and the nut 43 which is threaded on the outside of the boss 65 as illustrated. A gasket 68, formed preferably of rubber, is positioned underneath the lower electrode 64 to provide a seal. Additional sealing means are provided in the form of a gasket 69 formed preferably of cork and a brass washer 70, which are interposed between the undersurface of the housing 45 and the top of the nut 43, as shown.

Interposed between the upper and lower electrodes 61 and 64 is a mass of valve material 71 which may comprise silicon carbide or other suitable valve material well known to those skilled in the art. Under normal operating conditions the valve material 71 offers a comparatively high resistance to the flow of current therethrough. However, on the application of high or abnormal voltages due to lightning or switching surges, the resistance of the valve material 71 is decreased and surge current is permitted to flow therethrough. It will be observed that the mass of valve material 71 is positioned in the bottom of the glass housing 45 in close contact with the inner periphery of the side walls thereof.

Figure 8:
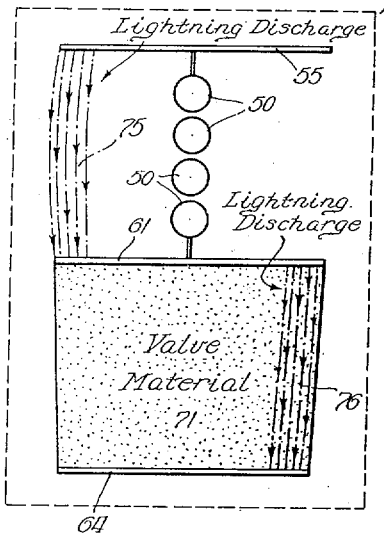
Figure 8 is a diagrammatic view showing different operating conditions of a lightning arrester on flow therethrough of surge current.

As illustrated more clearly in the diagrammatic representation of the lightning arrester 41 shown in Figure 8 of the drawings, the lightning discharge in many instances tends to take place along the lines 75 between the terminal cap 55 and the upper electrode 61. This is due to the fact that the voltage drop between the cylindrical spark gap electrodes 50 at the line or upper end is greater than it is near the ground or lower end of the arrester, due to the electrostatic capacity of the cylindrical spark gap electrodes 50. That is, the voltage drop across the spark gap assembly constitutes the major portion of the voltage drop across the arrester in many instances and, as a result, the arrester may break down or fail between the cap 55 and the upper electrode 61.

Figure 9:
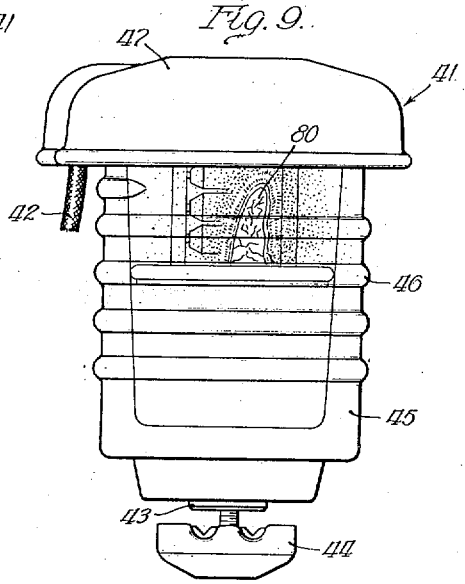
Figures 9, 10 and 11 are views showing different types of faults which may occur in lightning arresters as a result of the application to a transmission system of lightning or switching surges.

An illustration of this type of failure is shown at 80 in Figure 9 of the drawings. As there indicated, the arrester 41 has failed along the inner surface of the glass housing 45. Due to the formation of a conducting path by the surge current, causing the failure shown at 80, a comparatively low resistance path for the flow of power current is provided through the arrester and it therefore permits a slight leak of power current. Moreover, the effectiveness of the arrester is destroyed and it should at once be removed. Since the housing 45 is composed of a light-transmitting material, the fault 80, which emits light rays because of flow of follow current, may be readily noted on a casual inspection from the ground and the location of the faulty arrester will at once be apparent.

In many instances the lightning discharge will take place as indicated at 76 in Figure 8 of the drawings. The discharge here takes place between the upper and lower electrodes 61 and 64 along the inner surface of the glass housing 45 through the valve material 71. If the amount of surge current is not sufficient to cause the particles of valve material 71 to be fused into a conducting path, then on termination of the flow of surge current, the arrester will be restored to its normal condition.

Figure 10:
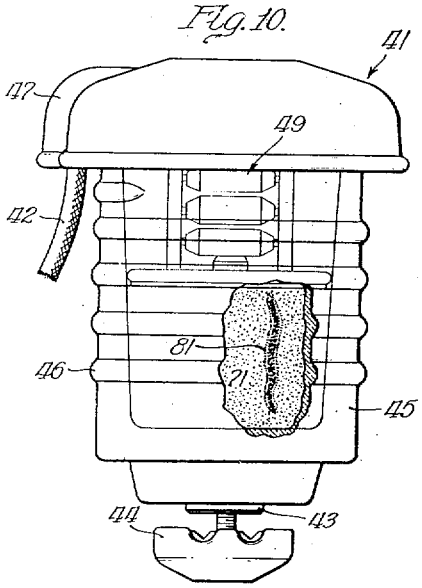

A typical example of a failure caused by this type of discharge is illustrated at 81 in Figure 10 of the drawings. As there shown, a portion of the glass housing 45 has been broken away to more clearly illustrate the conducting path which has been formed by fusion of particles of the valve material 71 into a conducting path by a lightning or switching surge which exceeded the capacity of the arrester 41. Since the particles of valve material 71 are fused together into a conducting path adjacent the inner surface of the glass housing 45, through which a slight amount of power current can flow from the conductor to ground, the flow of power current along it causes the path to become heated to such an extent that light rays are emitted therefrom. This flow of current constitutes a leak from the power line and destroys the effectiveness of the arrester 41. Moreover, due to the flow of current across the spark gap assembly 49, the arrester 41 operates after the fashion of a spark gap radio transmitter, as set forth hereinbefore, thereby causing radio interference in the vicinity of the transmission line. When an arrester has failed in this manner it should be immediately removed from the system.

Since the glass housing 45 is relatively thick—and we have discovered that it should be at least one-eighth inch or greater in thickness—the light rays emanating from the path 81 are reflected to such an extent that the discharge is visible from any point around the arrester housing 45. Therefore it is unnecessary to make a complete inspection of the arrester 41, but it is merely necessary to note whether or not a glow appears in the glass housing 41, either due to the direct rays from the path 81 heated by the flow of power current or by indirect rays reflected by means of the thick glass housing 45.

Figure 11:
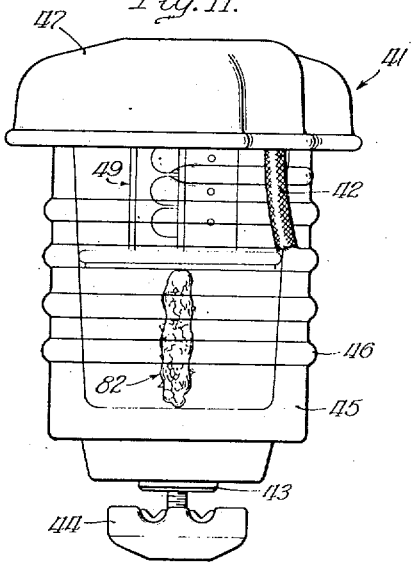

Still another form of failure is illustrated at 82 in Figure 11 of the drawings. As there shown, the flow of surge current has been so great as to cause a partial fusion of the glass housing 45 with a portion of the particles forming the valve material 71. The path 82 thus rendered conducting by the flow of surge current therethrough is capable of conducting a comparatively large amount of power current, thereby destroying the effectiveness of the arrester 41 and possibly causing considerable radio interference.

The typical failures of lightning arresters illustrated in Figures 9, 10 and 11 are those which have actually occurred and which we have observed. Any arrester that has failed to the extent indicated in any of these figures should be immediately removed from the system, since its effectiveness as an arrester has been destroyed. However, it would not be possible to detect failures of this type in arresters which are provided with opaque porcelain housings, as has been the standard practice in the prior art. It would be necessary either to make a detailed examination of each arrester to determine which one had failed to the extent indicated in these figures

BEST AVAILABLE COPY or it would be necessary to await the occurrence of a succeeding lightning or switching surge which may be sufficient to completely destroy or ground the arrester to permit a detection of the location of the fault. It is this type of failure for which our invention is particularly applicable.

It will therefore be apparent that we have provided a lightning arrester construction of novel form which immediately provides a visual indication of a partial failure thereof which has not been sufficient to completely destroy the arrester. The slight leakage or flow of power current is at once rendered visible and a cursory inspection will reveal the particular arrester which has failed and which should be removed from the system and replaced with a new arrester in proper operating condition. It is reiterated that it is the flow of power current along a path which has been rendered conducting by means of a lightning discharge that causes the path to be visible from any point around the arrester through the use of the glass housing 45 having relatively thick walls. Such visibility is, of course, impossible if a housing of porcelain or other opaque material is used.

The use of transparent heat resisting material such as Pyrex or the like, as described before, in the housing 45 results in certain functional and operational advantages which arise in part from the use of this transparent material in the walls of the housing 45 and in part from the close contact therewith of the valve material 71, which has also previously been described.

Since certain further changes may be made in the foregoing constructions and different embodiments of the invention may be made without departing from the scope thereof, it is intended that all matters disclosed in the foregoing description or shown in the accompanying drawings, shall be interpreted as illustrative and not in a limiting sense.

We claim as our invention:

1. In a lightning arrester for an alternating current power transmission line operating at a power frequency of 60 cycles or less, in combination, a spark gap assembly, a pair of spaced apart electrodes, a mass of electric valve material interposed therebetween, said spark gap assembly being connected in series circuit relation with said electrodes and valve material and the combination being disposed to be connected between said line and ground, and a glass housing having relatively thick walls surrounding said spark gap assembly and said valve material which permits light rays emanating from the interior thereof to be visible from substantially any point around the lightning arrester and which permits a visual inspection to determine the existence of any variations from the normal condition thereof.

2. The lightning arrester of claim 1 further characterized by the glass housing being made of a heat resistant type of glass material having a very low coefficient of expansion and a high melting point.

3. The lightning arrester of claim 1 further characterized by the valve material being in substantially physical contact with the housing and by the transparent glass housing being made of a heat resisting type of glass material having a very low coefficient of expansion and a high melting point.

RALPH H. EARLE.
ALWIN G. STEINMAYER.